United States Patent [19]

Kaneko et al.

[11] Patent Number: 4,608,599

[45] Date of Patent: Aug. 26, 1986

[54] INFRARED IMAGE PICKUP IMAGE

[75] Inventors: Akira Kaneko, Tokyo; Teruo Fumoto, Kanagawa; Jun Nishida, Tokyo, all of Japan

[73] Assignee: Matsushita Electric Industrial Co., Ltd., Osaka, Japan

[21] Appl. No.: 635,293

[22] Filed: Jul. 27, 1984

[30] Foreign Application Priority Data

Jul. 28, 1983 [JP] Japan ................................ 58-138022
Aug. 29, 1983 [JP] Japan ................................ 58-158347
Aug. 31, 1983 [JP] Japan ................................ 58-159420

[51] Int. Cl.⁴ .......................................... H04N 7/18
[52] U.S. Cl. ...................................... 358/113; 358/96; 358/146
[58] Field of Search ............... 358/113, 96, 142, 146; 250/333, 334

[56] References Cited

U.S. PATENT DOCUMENTS 3,806,633  4/1974  Coleman ............................ 358/113
4,164,753  8/1979  Metcalf ............................. 358/113
4,403,251  9/1983  Domarenok ....................... 358/113
4,481,535  11/1984  Hodd ................................ 358/113

Primary Examiner—Howard W. Britton
Attorney, Agent, or Firm—Burgess, Ryan & Wayne

[57] ABSTRACT

In an infrared image pickup device, an infrared image signal and a visible image signal are picked up from an object to be photographed, the infrared signal, the visible image signal and/or a visible profile image signal are transmitted in a time-division manner and are separated from each other, and an infrared image, a visible image, a visible profile image, an image obtained by superposing the visible image on the infrared image, and an image obtained by superposing the visible profile image on the infrared image are selectively displayed on different display monitors or a single display monitor in a synchronized manner or on said single display monitor in a separate manner.

17 Claims, 21 Drawing Figures

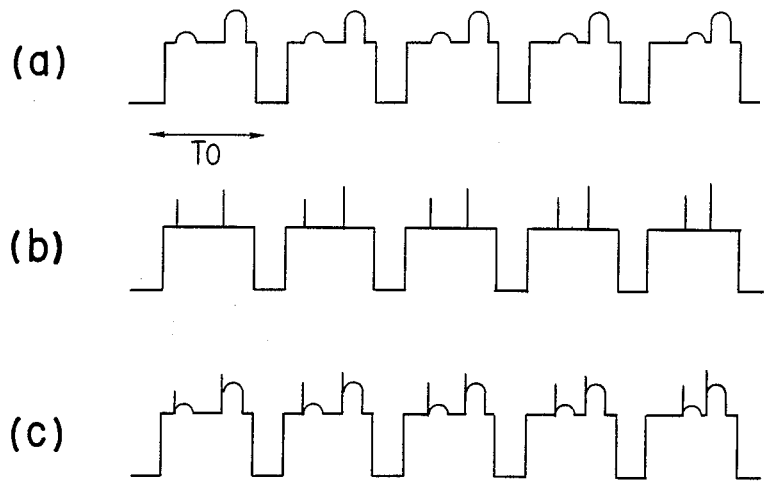

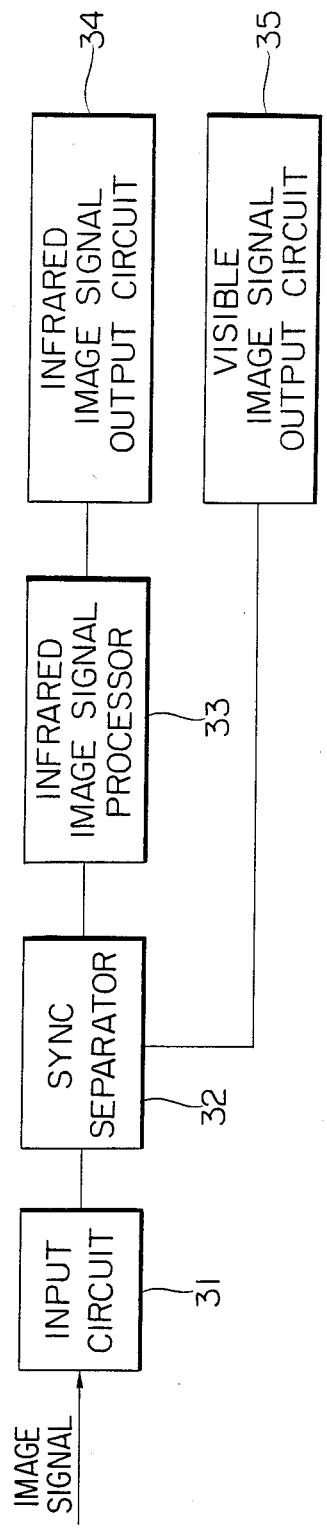
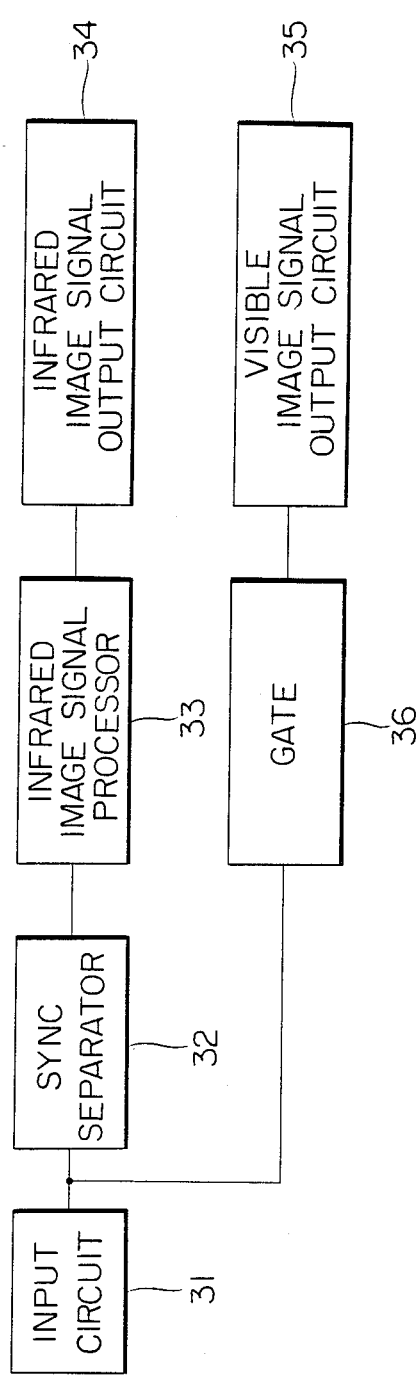

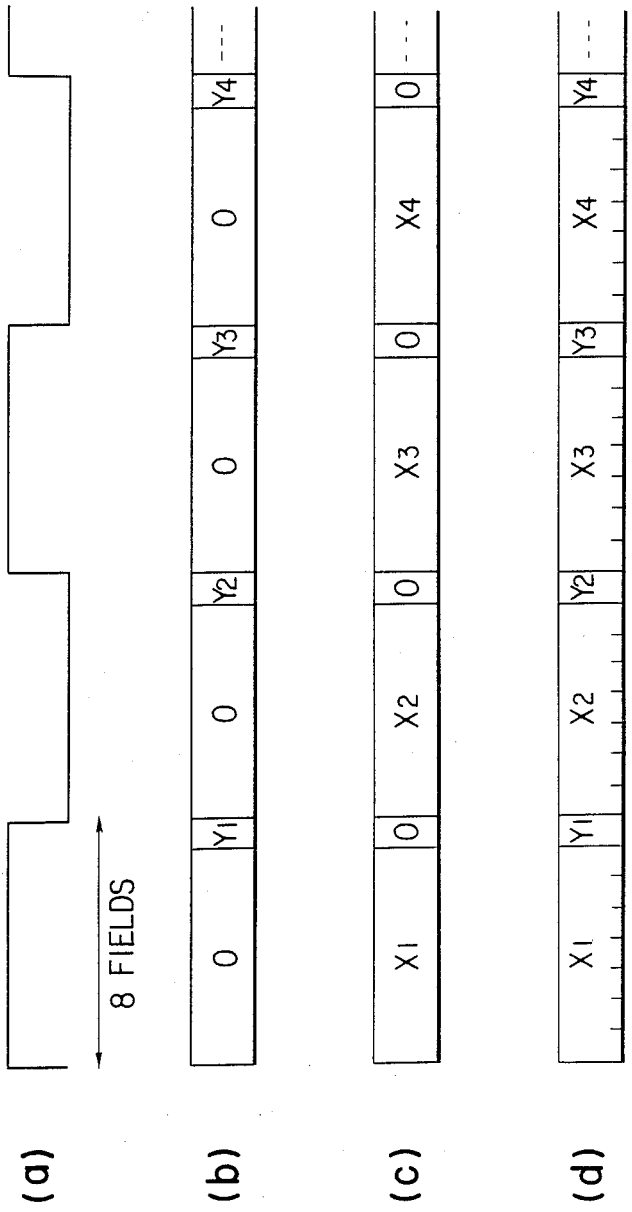

| $A_{11}$ | --- | $A_{1\ell}$ | $B_{11}$ | --- | $B_{1m}$ | $C_{11}$ | --- | $C_{1n}$ | $A_{21}$ | --- | $A_{2\ell}$ | $B_{21}$ | --- |

| $A_1$ | $B_1$ | $C_1$ | $A_2$ | $B_2$ | $C_2$ | $A_3$ | $B_3$ | $C_3$ | --- |

↕ 1/60

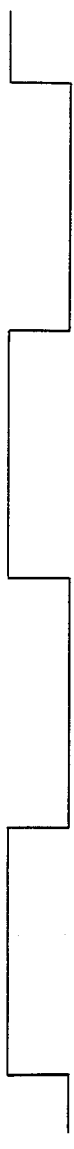
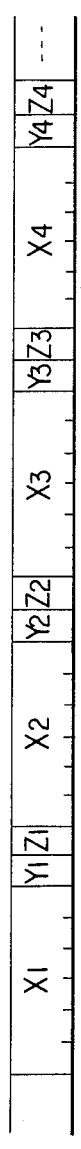
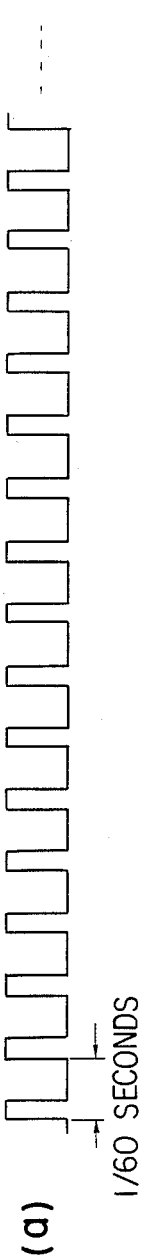
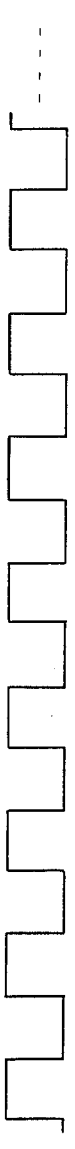
FIG. 14
FIG. 15

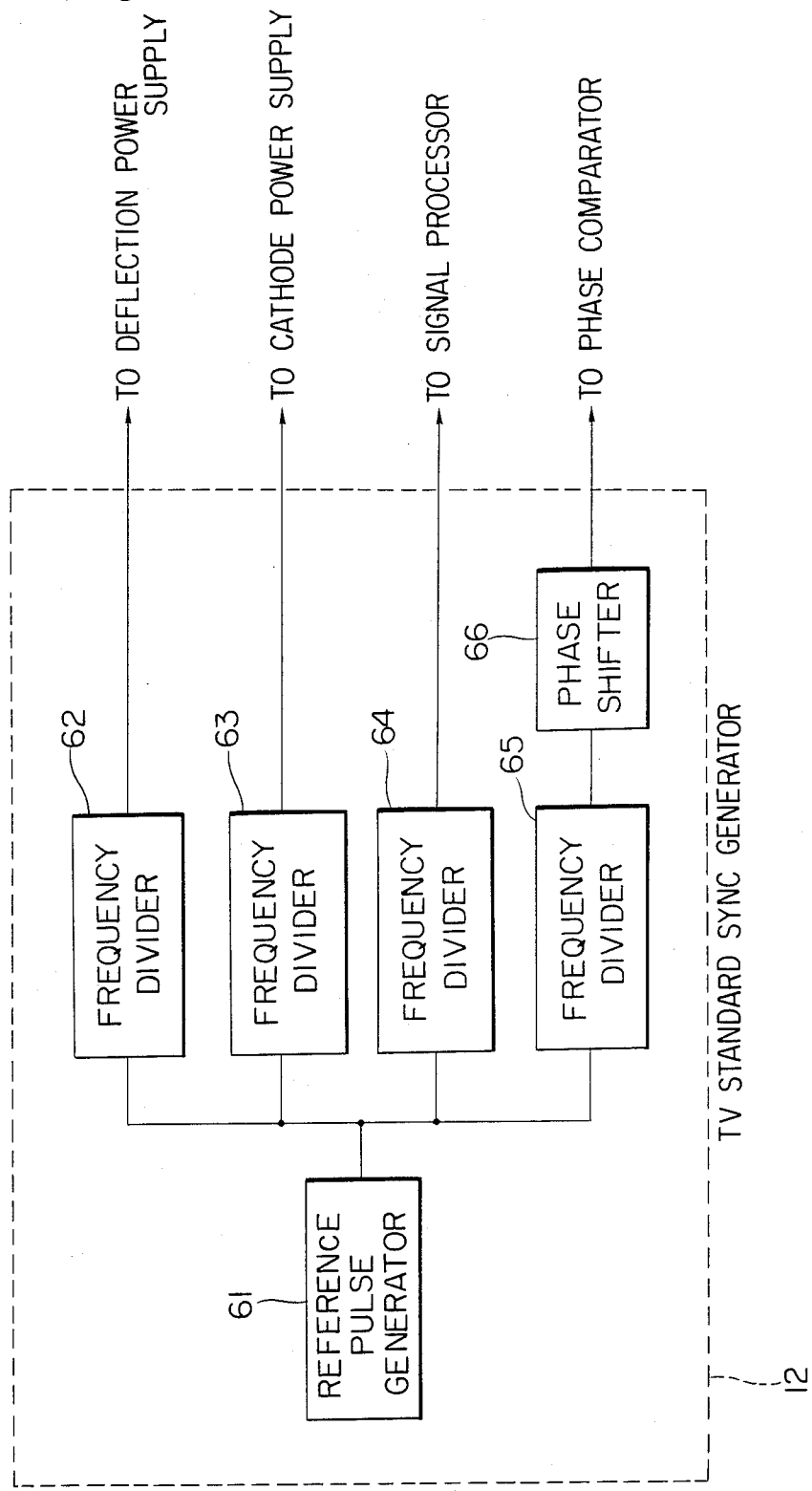

INFRARED IMAGE PICKUP IMAGE

BACKGROUND OF THE INVENTION

The present invention relates to an infrared image pickup device for converting a temperature distribution or profile of an object to a two-dimensional image which is displayed on a screen.

A conventional pyroelectric infrared image tube using a pyroelectric material as a target is proposed to convert a temperature distribution of an object to a two-dimensional image. This pyroelectric infrared image tube has been receiving a great deal of attention recently since it can be used with a standard television system. The operation of this infrared image tube will first be described. Infrared rays emitted from a surface of an object in accordance with a temperature distribution thereof are focused on a target through an optical system. When an image representing an infrared ray intensity distribution is formed on the target, the rays are absorbed in the target made of a pyroelectric material so as to cause a change in the temperature distribution on the surface of the target. This change causes a pyroelectric effect which induces a charge distribution. This charge distribution is then read in accordance with electron beam scanning, thereby obtaining an image signal representing the temperature distribution. Since the pyroelectric effect is defined as a phenomenon wherein charge is induced in accordance with a change in temperature, incident infrared rays must be shielded/passed by a chopper at a speed of several to ten times per second when a still image is photographed.

The basic arrangement of a conventional image pickup device having the above-mentioned pyroelectric infrared image tube is illustrated in FIG. 1. Infrared rays incident on a target 2 in a pyroelectric image tube 1 are shielded/passed by a chopper 4 which is rotated by a motor 3 so as to form a charge distribution image on the target 2. This image on the target 2 is scanned with an electron beam 6 by using a deflection coil 5 and is read from the target 2. The read image signal is amplified by an amplifier 7 and is then subjected to necessary signal processing in a signal processor 8. A resultant image signal is supplied to a display monitor 9 and is displayed thereon. A light-emitting element 10 and a photosensor 11 cooperate to detect a chopping timing of the chopper 4, and the motor 3 is controlled so as to synchronize the chopping timing with a vertical sync pulse of the electron beam. For example, when the chopper 4 is turned on/off for every eight fields, a signal obtained by 1/16 frequency-dividing a vertical sync pulse VD from a television standard sync generator 12 is compared by a phase comparator 13 with a pulse from the photosensor 11. An error signal from the phase comparator 13 is supplied to a motor control circuit 14 to control the speed of the motor 3 such that the chopper 4 is turned on/off for every eight fields. The sync pulse VD from the sync generator 12 is also supplied to a cathode power supply 15, a deflection power supply 16 and the like to control electron beam scanning. The sync pulse VD is also supplied to the signal processor 8 to control signal fetch timing and the like.

In the conventional infrared image pickup device, as shown in FIG. 1, an infrared image signal from an image pickup section 17 is processed by the signal processor 8, and the processed signal is displayed on the display monitor 9. In this sense, the conventional infrared image pickup device processes only the infrared signal. In addition, even when visible image information is added to the infrared information shown in FIG. 1, an infrared image signal from the image pickup section 17 is processed by the signal processor 8 so as to display an infrared image on the display monitor 9, and at the same time, a visible image signal from a visible image pickup section 18 is processed by a signal processor 19 so as to display a visible image on a display monitor 20, as shown in FIG. 2. In this manner, the infrared and visible image pickup units are simply arranged in parallel with each other.

In a method of displaying only the infrared image signal in FIG. 1, since the shape of the infrared image generally differs from that of the visible image, it is very difficult for an observer to decide which part of the object is photographed, resulting in inconvenience.

In a method shown in FIG. 2, assume that the infrared and visible image pickup sections 17 and 18 are used independently of the display monitors 9 and 20 so as to measure the temperature distribution of the object, that resultant images are recorded in VTRs, and that the images are reproduced and supplied to the signal processors 8 and 19. In this case, it is apparent from the above description that two VTRs for infrared and visible images are required. In addition, counts of the counters of these VTRs must be stored when the infrared and visible images at given time are observed, resulting in inconvenience for measuring the temperature distribution of the object. Furthermore, when the observer wishes to observe an infrared image in more detail (e.g., when the observer continues to observe an infrared still image on the display monitor 9), VTR signals representing visible images are continuously transmitted, and the infrared image is not synchronized with the visible image.

In order to overcome the above drawback, a method is proposed to superpose an infrared image with visible information. In this case, as shown in FIG. 3, infrared and visible image signals from infrared and visible image pickup sections 17 and 18 are mixed by a mixer 21, and a composite signal is then processed by a signal processor 22. A processed composite signal is displayed on a display monitor 23. In other words, as shown in signals (a) to (c) of FIG. 4, an infrared image output signal (a) from the infrared image pickup section 17 is mixed by the mixer 21 with the visible image output signal (b), and the composite signal (c) is generated by the mixer 21. Reference symbol $T_0$ denotes a signal transmission time interval for one-field picture. According to this conventional method, assume that only the infrared image pickup section 17 is separated from the system so as to measure the temperature distribution of the object, that a resultant image signal is recorded in a VTR, and that the image signal is reproduced from the VTR so as to observe the temperature distribution of the object. In this case, since only the infrared image is displayed on the display monitor, it is difficult for the observer to decide which portion of the object is displayed. In addition, when an image is obtained by superposing the visible profile image on the infrared image, it is an inconvenience to observe only the infrared image so as to check the temperature profile of the object.

SUMMARY OF THE INVENTION

It is an object of the present invention to overcome the conventional drawbacks and to allow an observer to be able to decide which portion of an object whose temperature distribution is measured is currently displayed.

It is another object of the present invention to simply and easily display a plurality of images such as an infrared image, a visible image and a visible profile image of the object which are reproduced by a single VTR.

It is still another object of the present invention to constantly produce a maximum signal output irrespective of a target material of an infrared image pickup device and a read technique of a signal charge.

In order to achieve the above objects of the present invention, there is provided an infrared image pickup device for reading an infrared image signal, a visible image signal and/or a visible profile image signal in a time-division manner in order to form a temperature distribution image of an object when infrared rays from the object subjected to temperature distribution measurement are incident on the device, and for simultaneously or selectively displaying the infrared image, the visible image, the visible profile image, an image obtained by superposing the visible profile image on the infrared image, an image obtained by superposing the visible image on the infrared image, and the like.

BRIEF DESCRIPTION OF THE DRAWINGS

FIG. 4 is a timing chart of conventional infrared and visible profile image signals and a signal obtained by superposing the visible profile image signal on the infrared image signal;

FIG. 5 is a block diagram schematically showing an infrared image pickup device according to an embodiment of the present invention;

FIG. 6 shows formats of signals for explaining the operation of the infrared image pickup device shown in FIG. 5;

FIG. 7 is a block diagram of an infrared image pickup device according to another embodiment of the present invention;

FIGS. 8 and 9 respectively show formats of signals for explaining the operation of the infrared image pickup device shown in FIG. 7;

FIGS. 11 and 12 respectively show formats of input signals supplied to the infrared image pickup device shown in FIG. 10;

FIG. 14 shows a waveform and a format of signals for explaining the operation of the infrared image pickup device shown in FIG. 13;

FIG. 15 shows waveforms of various reference sync signals used in the infrared image pickup devices of the present invention;

FIG. 21 is a block diagram of a sync generator in the infrared image pickup device of the present invention.

DESCRIPTION OF THE PREFERRED EMBODIMENTS

Figure 1:
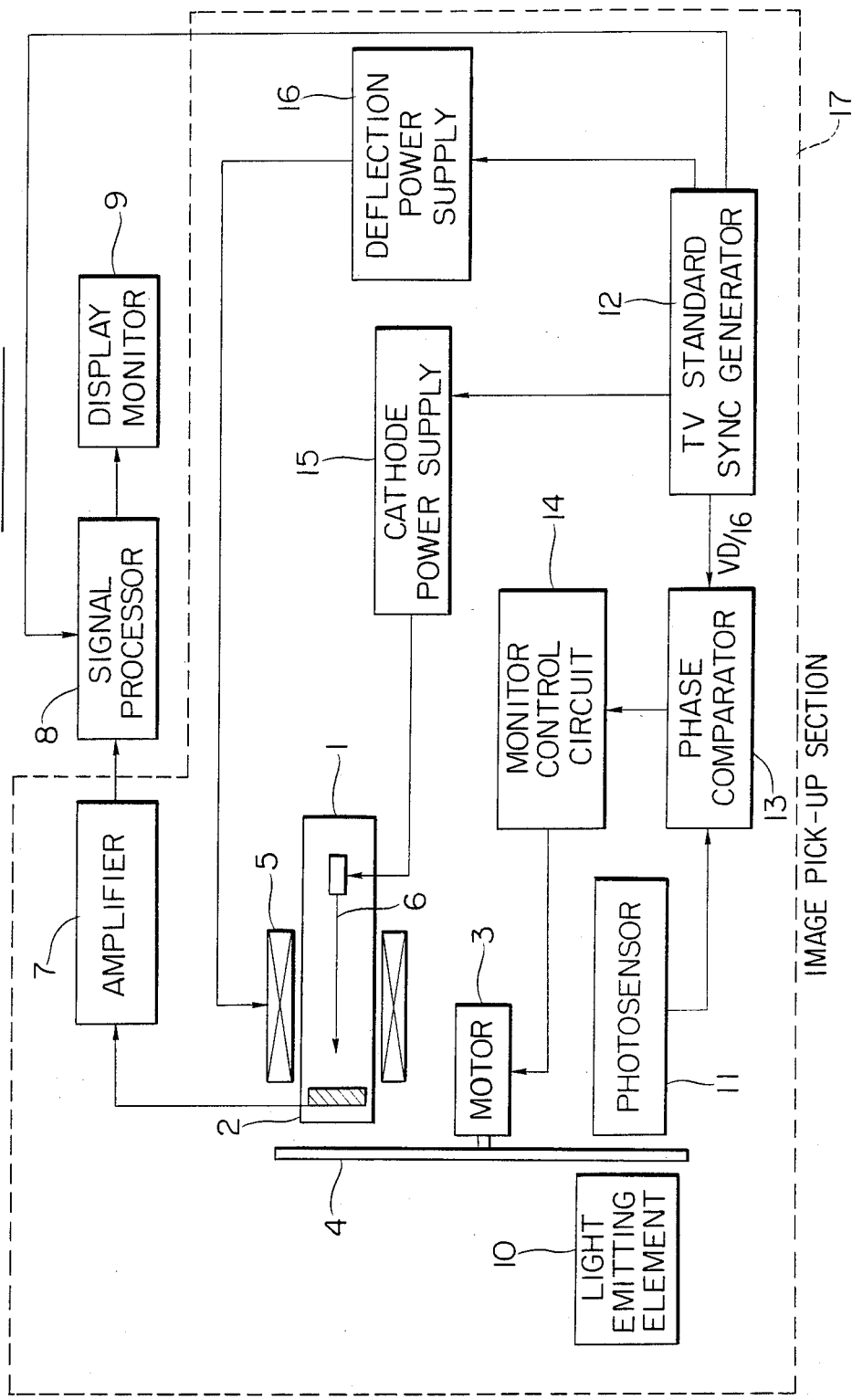
FIG. 1 is a block diagram showing an overall configuration of a conventional infrared image pickup device.
Figure 2:
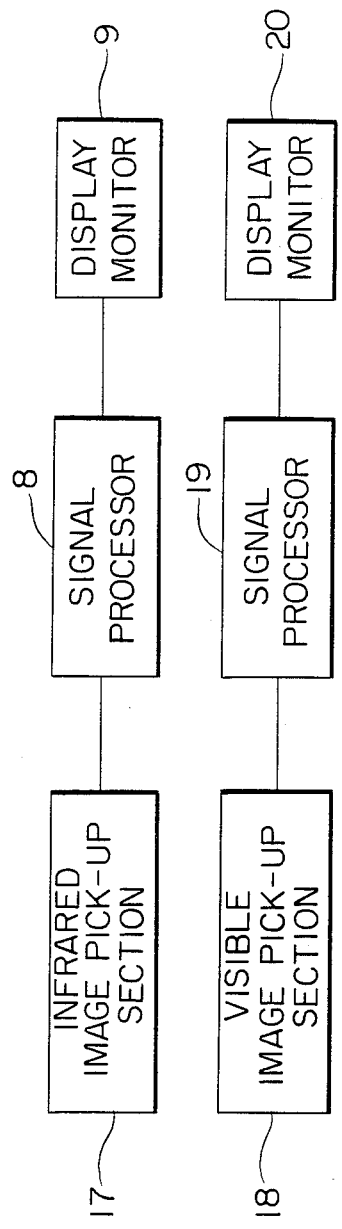
FIGS. 2 and 3 are block diagrams showing other conventional infrared image pick devices, respectively.
Figure 3:
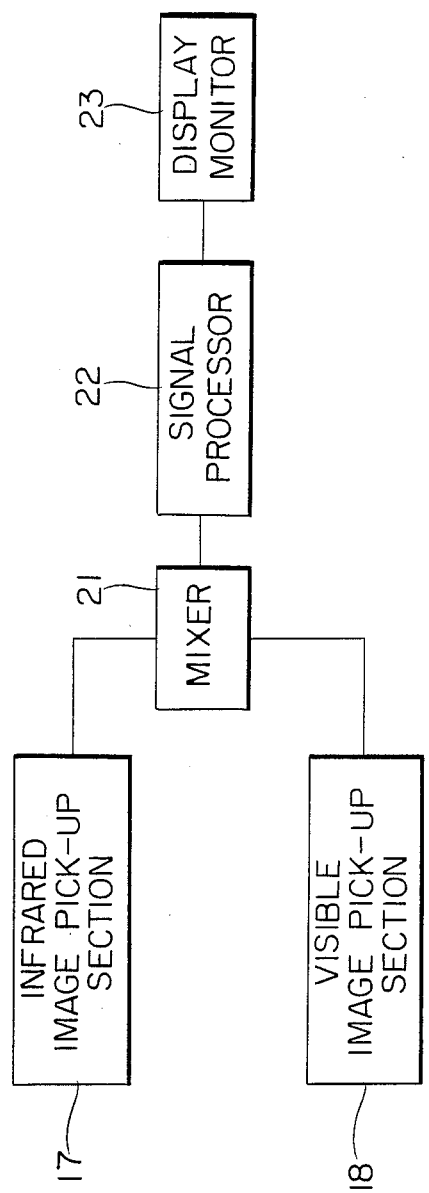

FIG. 5 shows an infrared image pickup device according to an embodiment of the present invention. By way of simplicity, a composite input image signal comprises an infrared image signal and a visible image signal in FIG. 5. Referring to FIG. 5, reference numeral 31 denotes an input circuit coupled to an image pickup section; 32, a sync separator; 33, an infrared image signal processor; 34, an infrared image signal output circuit; and 35, a visible image signal output circuit. The input image signal is denoted by symbol (a) in FIG. 6 and comprises the infrared image signal and the visible image signal combined in a time-division manner. When one-field image signals are received at intervals of T seconds, the infrared and visible image signals are respectively transmitted such that l image portions and m image portions are sequentially transmitted at a rate of $(l+m) \cdot T$. Referring to FIG. 6, reference symbols $A_{11} \ldots A_{1l}, A_{21} \ldots A_{2l}, \ldots$ denote infrared image signals; and $B_{11} \ldots B_{1m}, B_{21} \ldots B_{2m}, \ldots$, visible image signals. When the input image signal shown in FIG. 6 is supplied to the input circuit 31, the sync separator 32 separates the infrared image signal (b) from the visible image signal (c) in FIG. 6. It should be noted that non-signal portions of the separated infrared and visible signals (b) and (c) are represented by zeros. The infrared image signal is processed by the image processor 33, and a processed infrared image signal is supplied to the output circuit 34. The output circuit 34 generates an output signal (d), as shown in FIG. 6. In this case, $A^*_{11} \ldots A^*_{1l}$, and $A^*_{11} \ldots A^*_{1m}, \ldots$ represent the processed infrared image signal. Meanwhile, the visible image signal separated by the sync separator 32 is supplied to the visible image signal output circuit 35 without modification.

The infrared and visible image signals obtained as described above are supplied to separate display monitors or a single display monitor, so that the infrared and visible images can be simultaneously observed. In addition, since the visible image signal comprises a time-serial input signal, the image signal can be observed substantially simultaneously with the corresponding infrared signal. Furthermore, the input signals comprise a single time-serial signal consisting of the infrared and visible image signals. In order to observe the image recorded in a VTR or the like in a still mode, even if the VTR is paused at any time without paying attention to a count of the counter and is started again, the infrared and visible images can be substantially synchronized.

FIG. 7 shows another embodiment of the present invention. The same reference numerals used in FIG. 7 denote the same parts as in FIG. 5, and a detailed description thereof will be omitted. Reference numeral 36 denotes a gate. In this embodiment, the input signal represented by symbol (a) in FIG. 6 and applied to an input circuit 31 is supplied to a sync separator 32 and to the gate 36. The input signal supplied to the sync separator 32 appears as the signal (d) of FIG. 6 at an infrared image output circuit 34 in the same manner as in FIG. 5. The input signal supplied to the gate 36 appears as the signal (c) of FIG. 6 at a visible image output circuit 35.

In an infrared image pickup device using a pyroelectric material as an infrared image sensor, positive and negative image signals are obtained in accordance with the on/off operation of the chopper due to the principle of chopper operation. The magnitude and resolution of the positive and negative signals greatly depend on a phase difference with respect to the on/off timing of the chopper. An optimal infrared image signal has a phase synchronized with the on/off timing of the chopper. For example, when the chopper is turned on/off for every eight fields (2/15 seconds), as shown in a signal (a) in FIG. 8, the 8th field signals $Y_1, Y_2, \ldots$, as indicated by a signal (b) in FIG. 8, after the on/off operation of the chopper are used as the infrared image signals. On the other hand, the first to seventh field signals $X_1, X_2, \ldots$, as indicated by a signal (c) in FIG. 8, are used as the visible image signals for intervals wherein infrared image signals are not transmitted. A time-serial signal (d) in FIG. 6 which consists of the infrared and visible image signals is thus obtained. When the signal (d) is supplied to the input circuit 31 shown in FIG. 7, the infrared signals $Y_1, Y_2, \ldots$ are separated by the sync separator 32 from the signal applied to the input circuit 31. The infrared signals $Y_1, Y_2, \ldots$ are processed by the infrared image processor 33, and a processed infrared signal appears as an infrared image signal (a) of FIG. 9 at the infrared image signal output circuit 34. On the other hand, the signal supplied to the gate 36 gates the infrared image signal. A visible signal (b) in FIG. 9 appears at the visible image output circuit 35. Reference symbols $Y^*_1, Y^*_2, \ldots$ denote processed infrared image signal outputs, and reference numeral 0 denotes a non-signal portion. The infrared and visible image signals thus obtained are separately monitored to display the infrared and visible images separately on different display monitors or same display monitor's different portion in a synchronized manner. Therefore, even if the images are recorded in a VTR or the like and observed, the infrared and visible images can be observed synchronized with each other.

Figure 10:
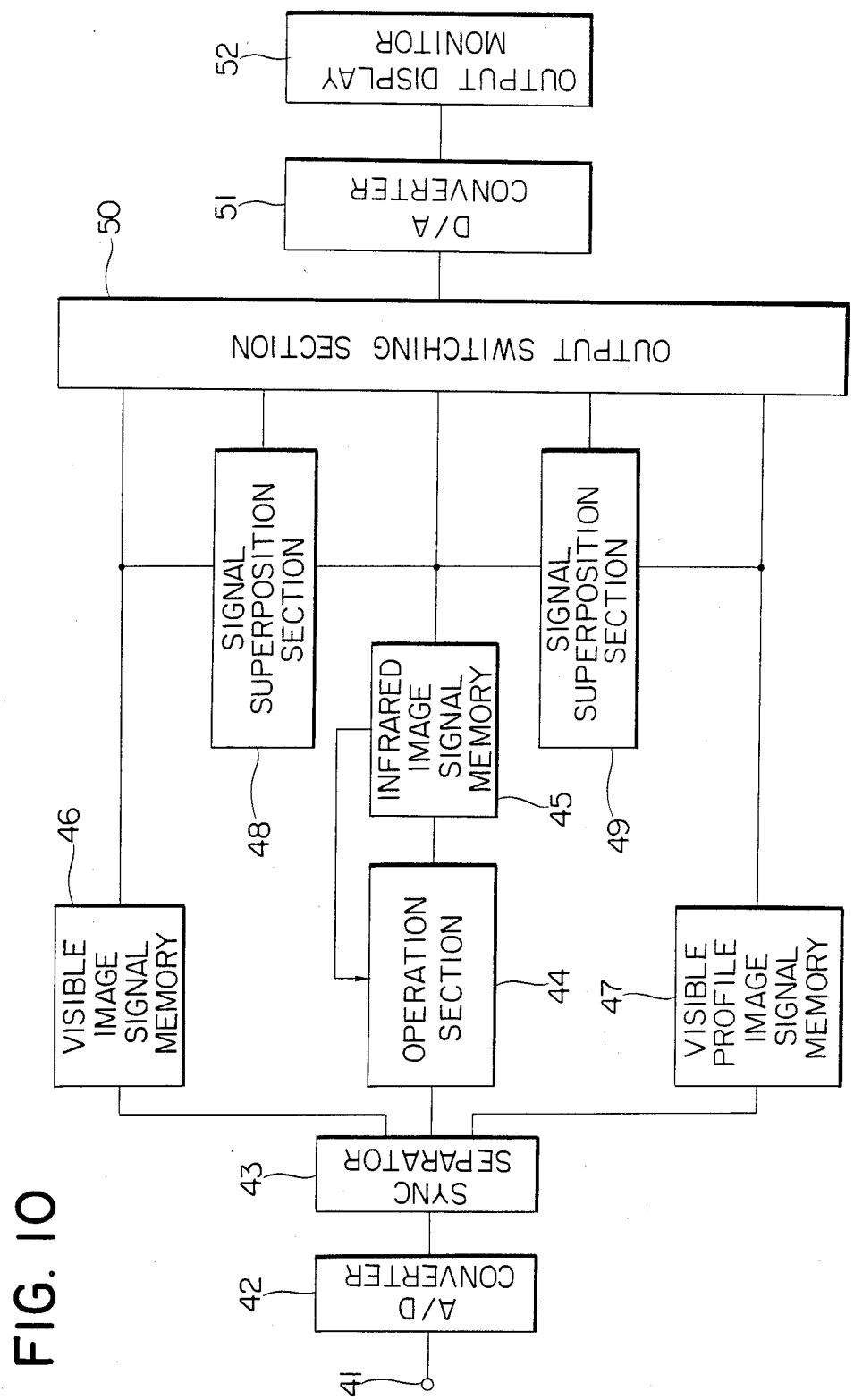
FIG. 10 is a block diagram of an infrared image pickup device according to still another embodiment of the present invention.

FIG. 10 is a block diagram of still another embodiment of the present invention, showing an arrangement of an image processor when an infrared image signal, a visible image signal and a visible profile image signal are used. Reference numeral 41 denotes an input terminal; 42, an A/D converter; 43, a sync separator; 44, an operation section; 45, an infrared image signal memory; 46, a visible image signal memory; 47, a visible profile image signal memory; 48 and 49, signal superposition sections, respectively; 50, an output switching section; 51, a D/A converter; and 52, an output display monitor. When one-field signals are received at intervals T, as shown in FIG. 11, l image portions of the infrared image signal, m image portions of the visible image signal and n image portions of the visible profile image signal are supplied in units of $(l+m+n) \times T$ periods. Reference symbols $A_{11} \ldots A_{1l}, A_{21} \ldots A_{2l}, \ldots$ denote infrared image signals; $B_{11} \ldots B_{1m}, B_{21} \ldots B_{2m}, \ldots$, visible image signals; and $C_{11} \ldots C_{1n}, \ldots$, visible profile image signals. The input signal consisting of the infrared, visible and visible profile image signals is supplied to the input terminal 41 and is converted by the A/D converter 42 to a digital signal. The infrared, visible and visible profile image signals are separated by the sync separator 43 from the input image signal and are stored in the memories 45 to 47, respectively. These memories 45 to 47 retain the current data signals until the next signals are supplied thereto. The current data signals are continuously read out from the corresponding memories 45 to 47. The infrared image signal is also fed back to the operation section 44 and is processed together with the next infrared image signal so as to improve its S/N ratio, and an updated infrared image signal is then stored in the memory 45. The signals read out from the memories 45 and 46 are superposed by the signal superposition section 48, and the signals read out from the memories 45 and 47 are superposed by the signal superposition section 49. The output switching section 50 selects one of the superposed signals from the signal superposition sections 48 and 49 and the infrared, visible and visible profile image signals from the memories 45 to 47. A signal selected by the output switching section 50 is converted by the D/A converter 51 to an analog signal. This analog signal is displayed on the output display monitor 52.

The operation by the operation section 44 is performed as follows. If an infrared image signal stored in the image memory 45 is defined as $S_M$, and the next infrared image signal to be stored in the image memory is defined as $S_I$, the operation section 44 performs the following calculation:

$(S_I - S_M)/M + S_M$ (M is a positive integer)

A calculated result is stored as an updated infrared image signal in the image memory 45 and is used as a signal $S_M'$ for the next calculation step, where M is a positive integer. It should be noted that, even if the order of the infrared, visible and visible profile image signals changes, the phases of the sync separator 43 can be adjusted to obtain substantially the same effect as described above, and that, even if the infrared, visible and visible profile image signals are supplied in a parallel manner, the phases of the sync separator can be adjusted to store the respective signals in the corresponding memories so as to obtain the same effect as described above.

When sets of an infrared image signal $(A_1, A_2, \ldots)$, a visible image signal $(B_1, B_2, \ldots)$ and a visible profile image signal $(C_1, C_2, \ldots)$ are sequentially supplied for every 1/60 second, as shown in FIG. 12, each of the corresponding memories shown in FIG. 10 has a memory capacity of $256 \times 256 \times 8$ bits. The data read out from the respective memories are selectively generated through the output switching section 50 so as to display an infrared image, a visible image, a visible profile image, an image obtained by superposing the visible profile image on the infrared image, or an image obtained by superposing the visible image on the infrared image on the display monitor.

Figure 13:
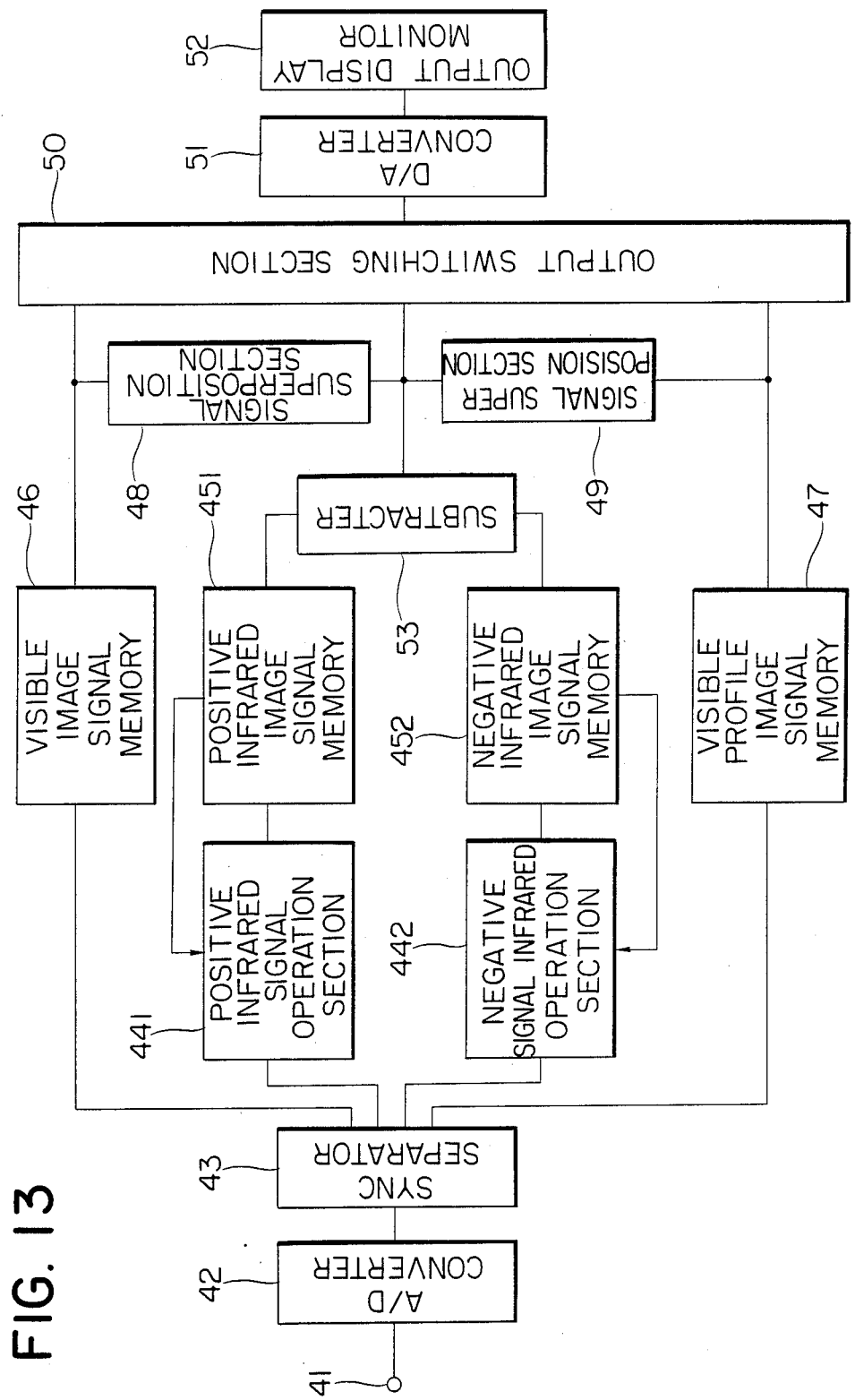
FIG. 13 is a block diagram of an infrared image pickup device according to still another embodiment of the present invention.

In the infrared image pickup device using a pyroelectric material as an infrared image sensor, the positive and negative infrared image signals are generated in synchronism with the on/off operations of the chopper due to its principle of operation. The infrared image signal memory and the operation section must be arranged, as shown in FIG. 13, so as to obtain the image processor having the effect of the present invention. The reference numerals in FIG. 13 denote the same parts as in FIG. 10. Reference numerals 441 and 451 denote a positive infrared signal operation section and a positive infrared image signal memory, respectively; 442 and 452, a negative infrared signal operation section and a negative infrared image signal memory; and 53, a subtracter. When the chopper is turned on/off for every eight fields (2/15 seconds), as indicated by a signal (a) in FIG. 14, an input image signal (b) in FIG. 14 is supplied to the input terminal 41. The image signal (b) supplied to the input terminal 41 is converted by the A/D converter 42 to a digital signal. Visible image signals $X_1, X_2, \ldots$, visible profile image signals $Y_1, Y_2, \ldots$, positive infrared image signals $Z_1, Z_3, \ldots$, and negative infrared image signals $Z_2, Z_4, \ldots$ are separated by the sync separator 43 from the input image signal and are sequentially stored in the image signal memories 46, 47, 451 and 452, respectively. Each of the image memories has a memory capacity of 256×256×8 bits and retains the currently stored signal until the next signal is supplied thereto. Each memory continuously generates the currently stored signal. The positive and negative image signals are processed to improve their S/N ratios in the following manner, respectively. If the positive infrared image signal currently stored in the image memory 451 is defined as $S_M$, and the next positive infrared image signal to be stored in the image memory 451 is defined as $S_I$, and a parameter prestored in a ROM is defined as 1/M (M is a positive integer), the operation section 441 subtracts the currently stored image signal $S_M$ from the next image signal $S_I$, multiplies the parameter 1/M with a subtracted result (remainder), and adds the resultant product to $S_M$. In other words, the operation section 441 performs the calculation $(1/M) \times (S_I - S_M) + S_M = (1/M) \times S_I + (1 - 1/M) \times S_M$ so as to update the storage content of the image signal memory 451. The signals can be averaged in accordance with motion of the object and changes in temperature distribution, thereby improving the S/N ratio by $10\log(2n-1)$ dB. The same operation as described above is performed for the negative infrared image signal, and an S/N ratio thereof is thus improved. In order to reduce background noise, the subtracter 53 subtracts the negative infrared image signals stored in the image memory 452 from the positive infrared image signal stored in the image memory 451. Therefore, an S/N ratio of the infrared image signal can be further increased. Thereafter, the visible image signal and the infrared image signal are superposed by the signal superposition section 48, and the infrared image signal and the visible profile image signal are superposed by the signal superposition section 49. As a result, the visible image signal, the infrared image signal, the visible profile image signal, the signal obtained by superposing the visible signal on the infrared image signal, and the signal obtained by superposing the visible profile image signal on the infrared image signal are selectively generated through the output switching section 50. A digital output signal selected by the output switching section 50 is converted to an analog signal by the D/A converter 51. This analog signal is displayed on the display monitor 52. In accordance with the circuit arrangement shown in FIG. 13, a desired output can be selected and displayed. Therefore, the visible image signal, the infrared image signal, the visible profile image signal, the signal obtained by superposing the visible signal on the infrared image signal, and the signal obtained by superposing the visible profile image signal on the infrared image signal may be arbitrarily and selectively displayed on the display monitor.

Figure 16:
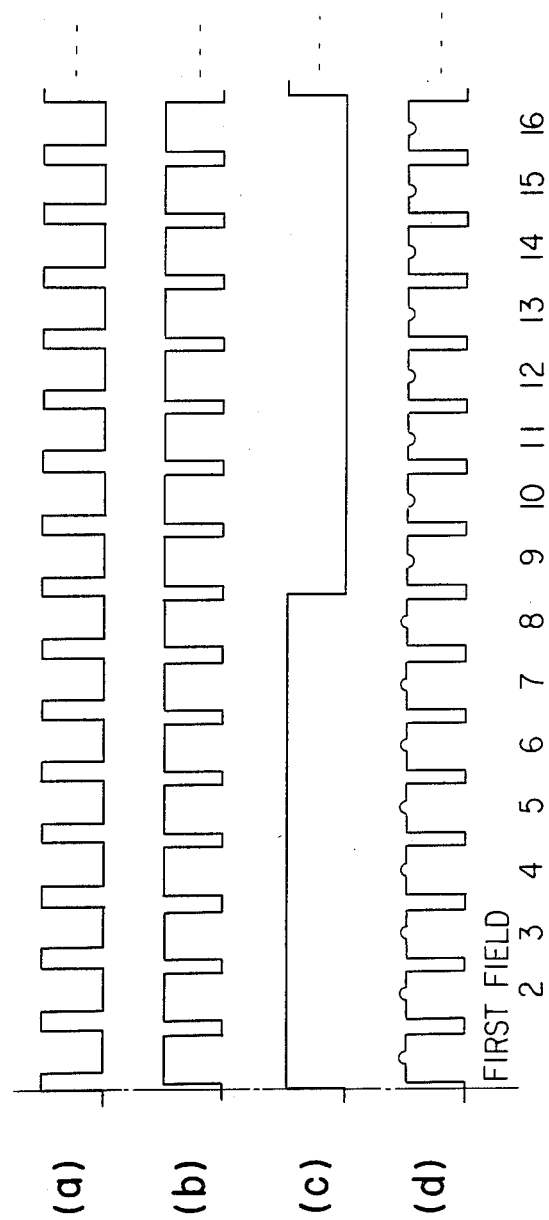
FIG. 16 is a timing chart of signals when normal operation is performed without phase shift.

In the pyroelectric infrared image pickup device for picking up an image in accordance with a standard television system, as previously described, when the chopper is turned on/off for, for example, every 8 fields, a pulse signal (a) in FIG. 15 having a 1/60 second period is used as a reference pulse signal. Pulse signals (b) to (e) in FIG. 15 are obtained by frequency-dividing the reference pulse by ½, ¼, ⅛ and 1/16, respectively. The pulse signals (b) to (e) are supplied as sync signals to the deflection power supply 16, the cathode power supply 15, the signal processor 8 and the phase comparator 13, as shown in FIG. 1, respectively. The pulse signal (e) in FIG. 15 is used as a reference pulse for controlling the motor for turning on/off the chopper. This signal (e) is supplied from the television sync pulse generator 12 to the phase comparator 13 and is subjected to phase comparison so as to control the motor and hence the on/off operation of the chopper. Phases of the components of the image pickup device, the on/off phase of the chopper and the field phase of the signal from the target 2 have the same relationships as those of the reference pulses of the reference signal, as indicated by signals (a), (b), (c) and (d) in FIG. 16. The signal (b) is generated from a pulse-synchronized portion of the image pickup device which excludes a synchronized portion for the on/off operation of the chopper. The signal (b) is typically used as a sync pulse for the deflection power supply. The signal (b) represents the sync pulse for the respective portions of the image pickup device which exclude the portion for synchronizing the chopper. Signal output fields immediately after opening of the chopper are given to be the first field, the second field, . . . and the 16th field immediately before the shutter is opened in the next cycle, as shown in FIG. 16.

Figure 17:
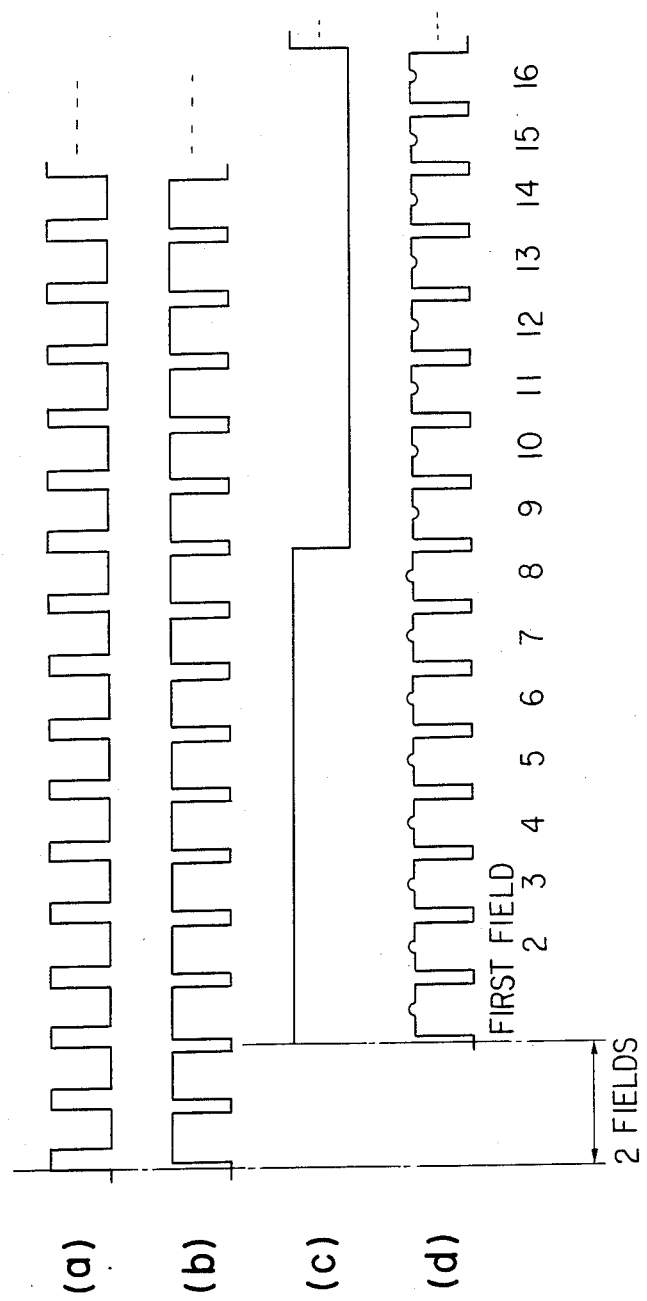
FIGS. 17 to 20 are respectively timing charts of signals for explaining the operations of the infrared image pickup devices of the above-mentioned embodiments.

When phase shift according to the present invention is performed, i.e., when the on/off phase of the chopper is shifted by n fields with respect to the reference signal (e.g., when the on/off timing of the chopper is delayed by a two-field period or 1/30 second), a sync signal (b) at each of the image pickup device, a chopper on/off signal (c) and a signal output field signal (d) in FIG. 17 have the same phases with respect to the pulse signal (a) as the reference signal in FIG. 17. When the phases of the signals in FIG. 17 are compared with those in FIG. 16, the content of the 15th field is shifted to the first field, and the content of the 16th field is shifted to the second field, . . . . In this manner, the contents of the signals are shifted.

Figure 18:
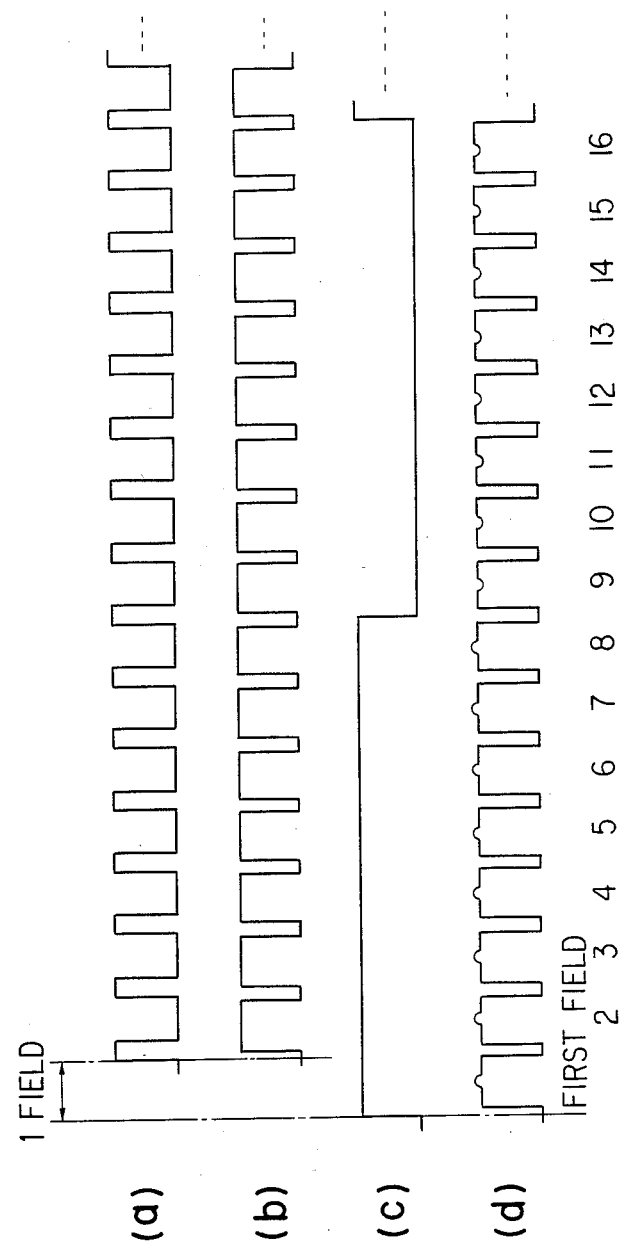

When the reference signal is shifted by n fields (i.e., 1/60 second) with respect to the on/off timing of the chopper, the relationships among the phases of the signals are as illustrated in FIG. 18. When the phases of the signals in FIG. 18 are compared with those in FIG. 16, the content of the second field is shifted to the first field, the content of the third field is shifted to the second field, . . . . In this manner, the contents of the signals are shifted.

By shifting the on/off phase of the chopper or the phase of the reference signal, signal outputs are shifted by a predetermined number of fields with respect to the signal output field positions in normal operation. In other words, the phases of the output signals can be shifted relative to that of the reference signal.

The above principle of phase shift operation will be described in detail.

Figure 19:
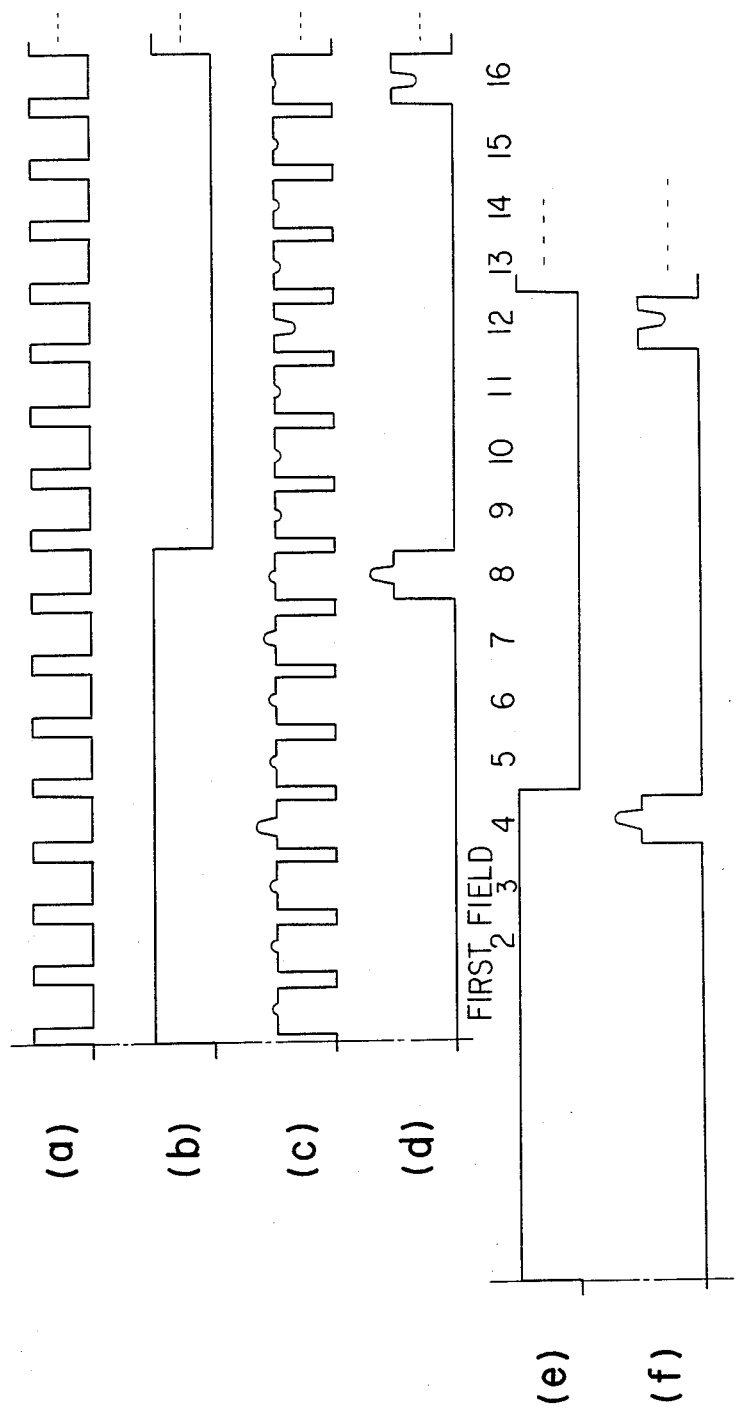

In a pyroelectric image pickup device, a chopper on/off signal (b) and an output signal (c) in accordance with the continuous field read system have phases with respect to that of a reference signal (a) in FIG. 19. According to the continuous signal read system, the signal is read once at a maximum signal output field while the chopper is turned on, and the signal is read once at another maximum signal output field while the chopper is turned off, as indicated by a signal (d) in FIG. 19. However, the positive and negative signals of the signal (c) in FIG. 19 correspond to the fourth and 12th maximum signal output fields, respectively. The fourth maximum signal output field of the positive image signal and the 12th maximum signal output field of the negative image signal do not correspond to the 8th and 16th maximum signal output fields of the signal (d) in FIG. 19, respectively. When the signals are respectively read during the on and off times of the chopper, the phase of the chopper is increased by four fields, or the phase of the reference signal is delayed by four fields. Therefore, the on/off phase of the chopper and the phase of the output signal are represented by signals (e) and (f) with respect to those of the reference pulse signal (a). The maximum output fields of the output signal (c) substantially correspond to those of the signal (f). As a result, the fields of the maximum output signals are given as the fourth and 12th fields with respect to the phase of the reference pulse.

Figure 20:
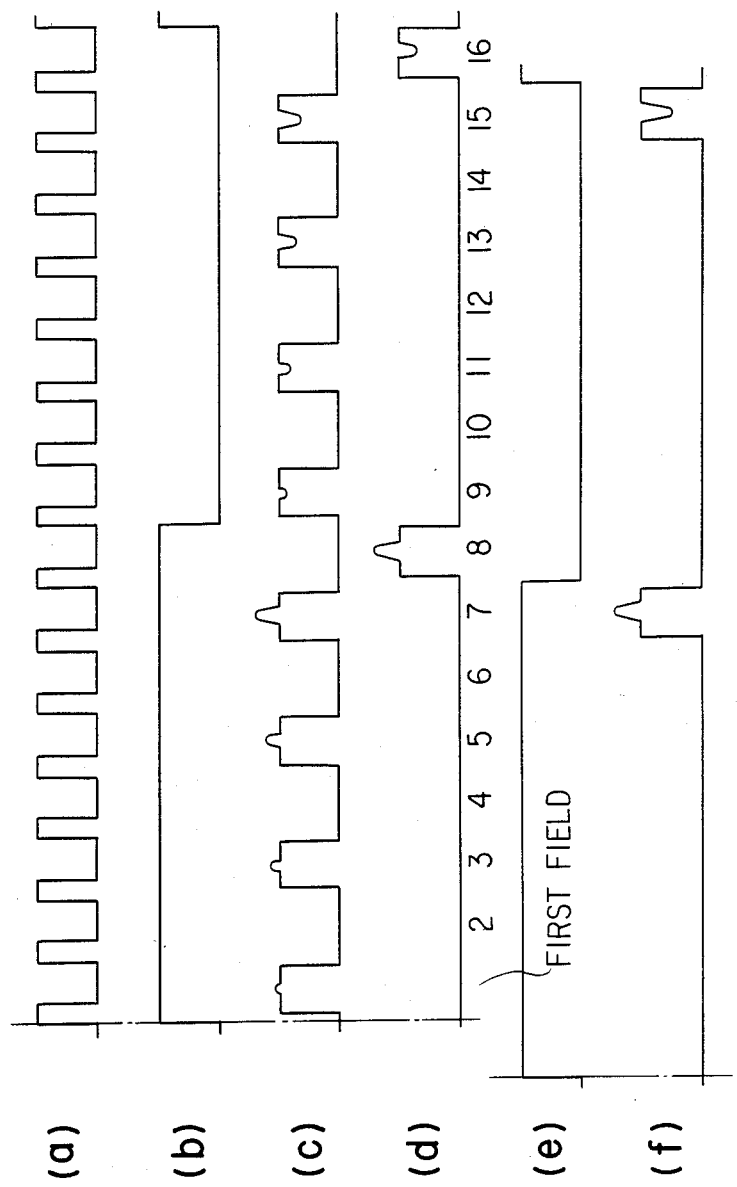

FIG. 20 shows a timing chart in a pyroelectric infrared image pickup device according to still another embodiment. In this pyroelectric infrared image pickup device, a chopper on/off signal (b), an output signal (c) read during every other field, and an output signal (d) read at maximum signal output fields respectively during the on and off times of the chopper have phases with respect to that of a reference pulse signal (a) in FIG. 20 in the normal signal read mode. The positive and negative image pulses of the signal (c) are read at the seventh and 15th fields and do not correspond to those which are read at the eighth and 16th fields for the signal (d). While the chopper is turned on and off to read each signal, the phase of the chopper is increased by one field, or the phase of the reference pulse as the reference signal is delayed by one field. Therefore, the chopper on/off phase and the output signal phase are represented by signals (e) and (f) with respect to the phase of the reference pulse signal (a). Therefore, the maximum output fields for the signal (c) correspond to those for the signal (f). The maximum signal output fields become the seventh and 15th fields with respect to the phase of the reference pulse.

FIG. 21 shows a circuit for performing the phase shift described above. Referring to FIG. 21, reference numeral 61 denotes a reference pulse generator for generating a reference pulse having a period of 1/60 second. This reference pulse is frequency-divided by frequency dividers 62, 63, 64 and 65 at predetermined frequency division ratios. The frequency-divided pulses are supplied as sync pulses to the deflection power supply 16, the cathode power supply 15, the signal processor 8 and the phase comparator 13. The frequency divider 65 frequency-divides the reference pulse at a ratio of 1/16. This 1/16 pulse is phase-shifted by a phase shifter 66 in accordance with a predetermined number of fields. The phase-shifted pulse is supplied to the phase comparator 13. The phase shift of the pulse shifted by the phase shifter 66 is determined as previously described in the above embodiments.

The reference pulse can also be phase-shifted by the same phase shifter as described above.

In the above embodiments, the infrared image signals have a single wavelength range. However, the infrared wavelength range may be divided into a plurality of subranges. The infrared image signals having a given subrange can be processed in a time-division manner as described above. Therefore, even if a change in temperature distribution is great, proper display can be performed.

What is claimed is:

1. An infrared image pickup device comprising:
   means for photographing an object to obtain one of at least an infrared image signal, a visible image signal and a visible profile image signal from an image pickup section in a time-division manner,
   means for separating the visible image signal and visible profile signal, and
   means for simultaneously displaying at least one of the visible image and visible profile image on at least one display monitor in a superposed manner or in a separate manner with the infrared image signal.

2. A device according to claim 1, further including means for obtaining the infrared image signal and the visible image signal from said image pickup section and means for simultaneously displaying the same at least one display monitor in a separate manner.

3. A device according to claim 1, further including means for obtaining the infrared image signal, the visible image signal and the visible profile image signal from the object; means for separating these signals from each other; means for superposing the visible image on the infrared image signal and the visible profile image signal on the infrared image signal; and means for selectively generating the infrared image signal, the visible image signal, the visible profile image signal, a signal obtained by superposing the visible image signal on the infrared image signal and a signal obtained by superposing the visible profile image signal on the infrared image signal.

4. A device according to claim 1, wherein there is provided means for storing the infrared image signal, means for performing a calculation as follows:

$(S_I - S_M)/M + S_M$ (M is a positive integer)

where
   $S_M$: an infrared image signal currently stored in said storing means
   $S_I$: a next infrared image signal to be stored in said storing means and means for storing a calculated infrared image signal as an infrared image signal for a next step in said storing means.

5. A device according to claim 1, further including a chopper for shielding passing the infrared image signal from the object to obtain positive and negative infrared image signal components, and means for obtaining a signal by subtracting the negative infrared image signal component from the positive infrared image signal component.

6. A device according to claim 1, further including means for providing a relative shift between a phase of a reference signal for producing a synchronizing pulse of said image pickup section and a phase of a chopper on/off signal to shift a phase of an output image signal with respect to that of the reference signal.

7. A device according to claim 1, further including means for dividing the infrared image signal in correspondence with a plurality of wavelength ranges.

8. An infrared image pickup device comprising:
   means for obtaining an infrared image signal and a visible image signal from an image pickup section in a time-division manner and separated from each other, and
   means for simultaneously displaying an infrared image and a visible image on at least one display monitor in a separate manner.

9. A device according to claim 8, wherein there is provided means for storing the infrared image signal, means for performing a calculation as follows:

$(S_I - S_M)/M + S_M$ (M is a positive integer)

where
- $S_M$: an infrared image signal currently stored in said storing means
- $S_I$: a next infrared image signal to be stored in said storing means and means for storing a calculated infrared image signal as an infrared image signal for a next step in said storing means.

10. A device according to claim 8, further including a chopper for shielding/passing the infrared image signal from the object to obtain positive and negative infrared image signal components, and means for obtaining a signal by subtracting the negative infrared image signal component from the positive infrared image signal component.

11. A device according to claim 8, further including means for providing a relative shift between a phase of a reference signal for producing a synchronizing pulse of said image pickup section and a phase of a chopper on/off signal to shift a phase of an output image signal with respect to that of the reference signal.

12. A device according to claim 8, further including means for dividing the infrared image signal in correspondence with a plurality of wavelength ranges.

13. An infrared image pickup device comprising means for producing an infrared image signal, a visible image signal and a visible profile image signal from an object to be photographed, means for separating the infrared image signal, the visible image signal and the visible profile image signal from each other, image signal storage sections for storing the infrared image signal, the visible image signal and the visible profile image signal, respectively, means for superposing the visible image signal on the infrared image signal, means for superposing the visible profile image signal on the infrared image signal, and means for selectively generating the infrared image signal, the visible image signal, the visible profile image signal, a signal obtained by superposing the visible image signal on the infrared image signal, and a signal obtained by superposing the visible profile image signal on the infrared image signal.

14. A device according to claim 13, wherein the infrared image signal from the object is shielded/passed by a chopper to obtain positive and negative infrared image signal components, and a signal is obtained by subtracting the negative infrared image signal component from the positive infrared image signal component.

15. A device according to claim 13, wherein a phase of a reference signal for producing a synchronizing pulse of said image pickup section and a phase of a chopper on/off signal are relatively shifted to shift a phase of an output image signal with respect to that of the reference signal.

16. A device according to claim 13, wherein there is provided means for storing the infrared image signal, and a calculation is performed as follows:

$(S_I - S_M)/M + S_M$ (M is a positive integer)

where
- $S_M$: an infrared image signal currently stored in said storing means
- $S_I$: a next infrared image signal to be stored in said storing means and a calculated infrared image signal is stored as an infrared image signal for a next step in said storing means.

17. A device according to claim 13, wherein the infrared image signal is divided in correspondence with a plurality of wavelength ranges.

* * * * *